US012742514B2

(12) United States Patent
Files et al.

(10) Patent No.: US 12,742,514 B2
(45) Date of Patent: Sep. 22, 2026

(54) DUAL PURPOSE INFORMATION HANDLING SYSTEM AND PERPHERAL DISPLAY STAND

(71) Applicant: Dell Products L.P., Round Rock, TX (US)

(72) Inventors: Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,764

(22) Filed: Jul. 30, 2024

(65) Prior Publication Data

US 2026/0036247 A1 Feb. 5, 2026

(51) Int. Cl.
*F16M 11/04* (2006.01)
*F16M 11/16* (2006.01)

(52) U.S. Cl.
CPC .......... *F16M 11/046* (2013.01); *F16M 11/16* (2013.01); *F16M 2200/025* (2013.01)

(58) Field of Classification Search
CPC ................ G06F 1/1658; G06F 1/1607; F16M 2200/025; F16M 11/16; F16M 11/046
USPC .......................................................... 248/918
See application file for complete search history.

(56) References Cited

U.S. PATENT DOCUMENTS 4,814,759 A 3/1989 Gombrich et al.
6,516,421 B1 2/2003 Peters
6,549,194 B1 4/2003 McIntyre
6,583,771 B1 6/2003 Furuhashi
6,805,327 B1 * 10/2004 Shen ..................... A47B 91/02 248/676
6,909,598 B2 * 6/2005 Cheng ................. F16M 11/041 248/176.1
7,527,228 B2 * 5/2009 Chung .................. F16M 11/22 248/154
7,529,083 B2 5/2009 Joeng
7,738,245 B1 6/2010 Stifal
7,995,332 B2 8/2011 Ozolins
8,120,904 B2 * 2/2012 Morrison ............... G06F 1/181 248/286.1

(Continued)

OTHER PUBLICATIONS

Dell, "Monitor Arm," downloaded from dell-singlearm-monitor_setup guide_en-us.pdf on Jul. 29, 2024, 2 pages.

(Continued)

*Primary Examiner* — Christopher Garft
(74) *Attorney, Agent, or Firm* — Zagorin Cave LLP; Robert W. Holland

(57) ABSTRACT

A dematerialized information handling system display stand supports a display assembly with vertical adjustments using a single injection molded polyoxymethylene (POM) sliding member inserted in an extruded aluminum riser. A compression spring locks the sliding member in place with torsional force that releases to enable vertical movement. A mount couples to a rear side of the riser with a rail in a channel of the mount engaged in a guide formed in the riser at extrusion of the riser. An information handling system housing couples to the mount. When removed from the riser, the mount assembles into a stand with the housing supported in the channel.

9 Claims, 18 Drawing Sheets

(56) References Cited

U.S. PATENT DOCUMENTS 8,172,186 B2 * 5/2012 Tsai ........................ F16M 11/22 361/679.22
8,191,837 B2 * 6/2012 Chen ..................... G06F 1/1607 248/176.1
8,576,551 B2 11/2013 Oh et al.
8,596,599 B1 12/2013 Carson
9,746,128 B2 8/2017 Huang
9,958,108 B2 5/2018 Bowman et al.
10,018,225 B1 7/2018 Yen
D837,223 S 1/2019 Wu et al.
10,492,316 B2 * 11/2019 Sung ..................... G06F 1/1601
10,524,369 B2 * 12/2019 Chiu .................... F16M 11/046
10,790,641 B1 9/2020 Yao
11,187,254 B2 * 11/2021 Chou ...................... F16B 21/02
11,378,225 B2 7/2022 Laurent et al.
11,526,141 B2 12/2022 Matlin
11,550,532 B1 1/2023 Sanchez
11,841,107 B1 12/2023 Klein
2001/0010779 A1 8/2001 Pfister
2003/0015632 A1 1/2003 Dunn
2005/0236533 A1 10/2005 McRight et al.
2006/0082265 A1 * 4/2006 Quijano .................. G06F 1/181 312/223.2
2007/0210231 A1 9/2007 Sim
2007/0247795 A1 * 10/2007 Tseng ................... F16M 11/046 361/679.07
2010/0081377 A1 4/2010 Chatterjee
2010/0128423 A1 5/2010 Moscovitch
2010/0141864 A1 * 6/2010 Lai ......................... F16M 11/22 361/679.02
2010/0188812 A1 * 7/2010 Morrison ................ G06F 1/181 248/274.1
2011/0223802 A1 9/2011 Zeller
2012/0242893 A1 9/2012 Akitomo
2013/0027370 A1 1/2013 Dunn et al.
2013/0058030 A1 * 3/2013 Mabon ................. G11B 33/124 361/679.32
2014/0035795 A1 2/2014 Park
2014/0321039 A1 * 10/2014 Quijano ................. F16M 11/22 361/679.22
2016/0275880 A1 9/2016 Chen
2017/0045936 A1 2/2017 Kakapuri
2018/0067517 A1 3/2018 Sasaki
2019/0026062 A1 1/2019 Seo
2019/0261525 A1 * 8/2019 Chiu .................... H05K 5/0234
2019/0265939 A1 8/2019 Foster
2020/0004300 A1 1/2020 Xia
2020/0234628 A1 7/2020 Kim
2020/0238826 A1 7/2020 Mizobata
2021/0056877 A1 2/2021 Chew
2021/0373838 A1 12/2021 Kim
2022/0262284 A1 8/2022 Takao
2022/0282824 A1 9/2022 Hsu
2022/0390060 A1 12/2022 Ho
2023/0188680 A1 6/2023 Files
2023/0252939 A1 8/2023 Yu
2024/0053884 A1 2/2024 Selvi
2024/0096274 A1 3/2024 Yang
2024/0355308 A1 10/2024 Nishio

OTHER PUBLICATIONS

Dell, "Dell Dual Monitor Stand MDS19," downloaded from manual7005474-dell-dual-monitor-stand-mds19.pdf on Jul. 29, 2024, 2 pages.
Dell, "Dell™ MKS14," downloaded from dell-mks14_setup guide_en-us.pdf on Jul. 29, 2024, pp. 1-22.
Dell, "Dell™ E-Flat Panel Stand User's Guide," downloaded from e-flp_user's guide_en-us.pdf (dell. com) on Jul. 29, 2024, 22 pages.
Dell, "Dell S2721D/S2721DS Monitor User's Guide," downloaded from dell-s2721d-monitor_user's-guide_en-us.pdf on Jul. 29, 2024, pp. 1-69.
Dell, "User's Guide Dell Monitor Stand with USB 3.0 Dock MKS14," downloaded from dell-mks14_user's guide_en-us.pdf on Jul. 29, 2024, 23 pages.

* cited by examiner

DUAL PURPOSE INFORMATION HANDLING SYSTEM AND PERPHERAL DISPLAY STAND

BACKGROUND OF THE INVENTION

Field of the Invention

The present invention relates in general to the field of information handling system displays, and more particularly to a dual purpose information handling system and peripheral display stand.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information. Stationary information handling systems, such as desktops and towers, operate the processing component in a stationary housing that interacts with an external power source and external peripheral devices, such as keyboard, mouse and display. Portable information handling systems have a portable housing that integrates a display and a power source to support mobile operations. Portable information handling systems allow end users to carry a system between meetings, during travel, and between home and office locations so that an end user has access to processing capabilities while mobile. Portable information handling systems typically also interact with end users through external peripheral devices, which tend to offer larger and more comfortable interfaces for the end user than integrated devices. A typical desktop environment will include a peripheral keyboard and peripheral mouse to accept end user inputs and a peripheral display to present information as visual images.

Peripheral displays typically include a display panel with an array of pixels that generate a visual image from pixel values communicated by an information handling system. The array of pixels may include liquid crystal display (LCD) pixels that filter light from a white backlight source with red, green and blue liquid crystal material or organic light emitting diode (OLED) pixels that generate red, green and blue light when an electric field is applied. The display panel is fed a stream of pixel values across the array by a timing controller that scans the values to the array of pixels. The timing controller receives the pixel values from a scalar that adjusts the pixel values to a scale appropriate for the array of pixels, such as different resolutions that depend upon the visual image to be presented and the dimensions of the array of pixels in the display panel. A power board receives external power and applies the power to the display panel, backlight, timing controller and scalar. The visual images are typically communicated to the scalar through a standardized cable and connector, such as an HDMI, DisplayPort or USB Type-C interface. Typically, the display panel assembles in a flat panel configuration and couples to a display stand that holds the display assembly in a viewing position. For example, the backside of the display assembly couples to a display stand with a VESA standard coupling interface.

One difficulty with peripheral displays is that different sizes and arrangements of the components tend to result in complex designs. Peripheral displays are not typically upgradeable or repairable. When a display component goes bad, the complete display assembly and stand is typically disposed of as general waste without recycling. In particular, peripheral displays tend to have complex designs held together by screws that are difficult to disassemble so that efforts to recycle display components are not typically cost effective. A lack of modularity impedes repair and upgrade operations, which tends to result in premature disposal that exacerbates environmental electronic waste management problems. In addition, the use of unsustainable materials and manufacturing processes further contributes to environmental harm. For instance, even when a peripheral display is torn down for recycling, the lowest common component modules tend to include a variety of materials that are not compatible with each other for a recycle process. Design constraints and technical considerations make modularity and ease of repair difficult to achieve, especially in the display assembly backplane and midplane that have expensive critical components of a display monitor.

SUMMARY OF THE INVENTION

Therefore, a need has arisen for a system and method which dematerializes information handling system display stands to improve reuse and recycling and reduce the carbon footprint of manufacture.

Another need exists for a system and method which improves peripheral display interactions when multiple display assemblies couple to a display stand.

In accordance with the present invention, a system and method are provided which substantially reduce the disadvantages and problems associated with previous methods and systems for manufacture, reuse and recycling of an information handling system display stand. A display stand is dematerialized to have fewer components assembled with like materials that more readily recycle at display stand end of life.

More specifically, an information handling system processes information with a processor and memory that cooperate to execute instructions that present the information as visual images at a peripheral display coupled to a display stand having a base, a riser and a display support. A display stand riser is dematerialized by a single sliding member inserted in the riser interior with a guide and rail interaction between the single member and riser interior. A hinge support member couples directly to a formed cavity in a front side of the sliding member with a single screw to accept a display support through a slot in the front side of the riser and to capture a compression spring that controls the sliding member in a fixed position or sliding in the riser interior. A modularized pivot assembly couples through the slot to the hinge support member to couple with a VESA standard display attachment feature. The riser couples to a stand base by a riser insert that rotates relative to the stand base. In one embodiment, the riser insert rests on a single piece stand base to rotate about an axis extending up from below the stand base. In an alternative embodiment, the insert is captured between upper and lower stand base. The display stand may include plural display supports to hold plural display assemblies that rotate between portrait and landscape orientations. Display positions on the display stand and display orientations are stored in EDID memory of the display to retrieve to an information handling system at power up.

The present invention provides a number of important technical advantages. One example of an important technical advantage is that an information handling system peripheral display stand is dematerialized to have fewer components with a common material type that improves manufacturing and end of life reuse and recycling. For example, an extruded aluminum riser has rails formed along an interior during extrusion that engage with guides formed in an injection molded sliding member to replace a separate rail system and sliding assembly of a conventional display stand. The arrangement reduces the number of components by approximately one-half to reduced assembly costs and improve end of life tear down. The result is an improved display stand at a lower cost and a reduced carbon footprint while meeting and exceeding end user expectations for display stand interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display stand has a dematerialized construction to enhance assembly and disassembly for improved component reuse and recycling. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
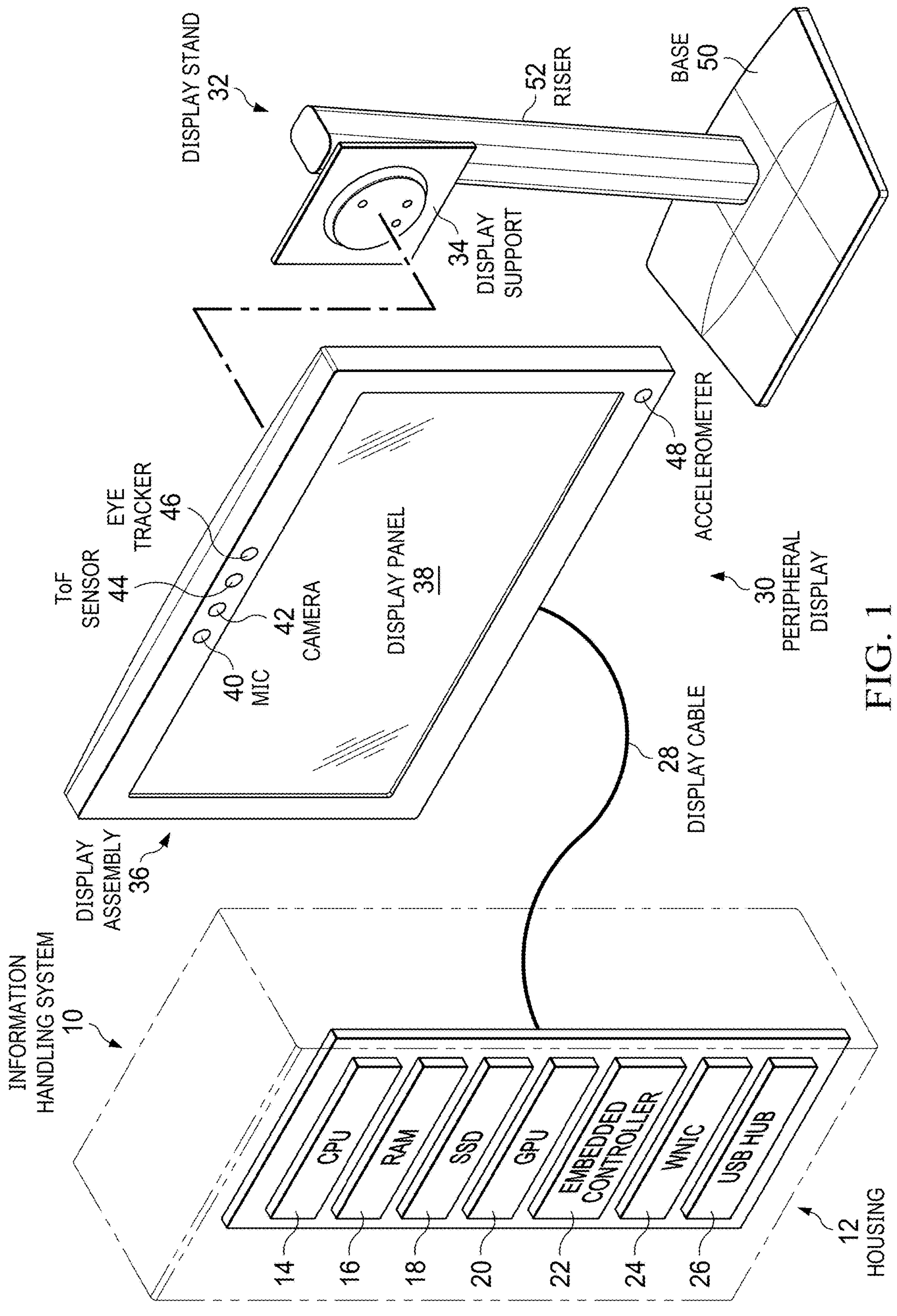
FIG. 1 depicts a block diagram of an information handling system interfaced with a peripheral display that presents information as visual images.

Referring now to FIG. 1, a block diagram depicts an information handling system 10 interfaced with a peripheral display 30 that presents information as visual images. A housing 12 contains processing components that cooperate to process information and can include stationary housings, such as for desktop or tower information handling systems, and portable housings, such as for convertible or tablet information handling systems. A central processing unit (CPU) 14 executes instructions that process information in cooperation with a random access memory (RAM) 16 that stores the instructions and information. A solid state drive (SSD) 18 provides persistent non-transitory memory that stores information when the system is powered down, such as an operating system and applications that are retrieved to RAM 16 by an embedded controller 22 when the system powers up. Embedded controller 22 manages system operating conditions, such as power and thermal operating conditions, and interactions with input/output devices, such as a keyboard and mouse to accept end user inputs. A graphics processing unit (GPU) 20 interfaces with CPU 14 to further process information into a format for presentation at a display panel, such as by defining a visual image as an array of pixel values. In the example embodiment, GPU 20 outputs the visual image information through a variety of different display cable ports, such as a Type C USB port, a DisplayPort port and an HDMI port, that are managed by a USB hub 26. A wireless network interface controller 24 (WNIC) supports communication with external networks and devices, such as through Ethernet, WIFI and BLUETOOTH.

In the example embodiment, information handling system 10 presents information as visual images at a peripheral display 30 by communicating the visual information from display cable ports through display cable 28 to display cable ports of peripheral display 30. A USB Hub 26 included in information handling system 10 includes a capability to communicate power and information between information handling system 10 and peripheral display 30, such as in accordance with the USB Type C standard. Peripheral display 30 has a display assembly 36 that is held in a viewing position by a display stand 32. Display assembly 36 has a display panel 38 at a front face that has an array of pixels configured to present visual images based upon pixel values communicated from GPU 20. In the example embodiment, display assembly 36 includes a variety of accessories that provide different functionalities, such as a microphone 40, a camera 42, a time of flight sensor 44, an eye tracker 46 and an accelerometer 48. Peripheral display 30 is powered by one or both of an external AC power cord that interfaces with an AC plug and an external AC-to-DC power adapter that interfaces with a DC plug, such as a barrel connector or a USB Type C cable connector. In addition to the AC and DC plugs, peripheral display 30 may operate on power received from information handling system 10, such as through a Type C USB cable connection power transfer. Display stand 32 has a base 50 that rests on a surface, such as a desktop, a display support 34 that couples to display assembly 36, such as with a VESA standard coupling arrangement, and a riser 52 that holds display support 34 in a raised position over base 50. In various embodiments, display stand 32 supports vertical and rotational orientation adjustments of display assembly 36.

Figure 2:
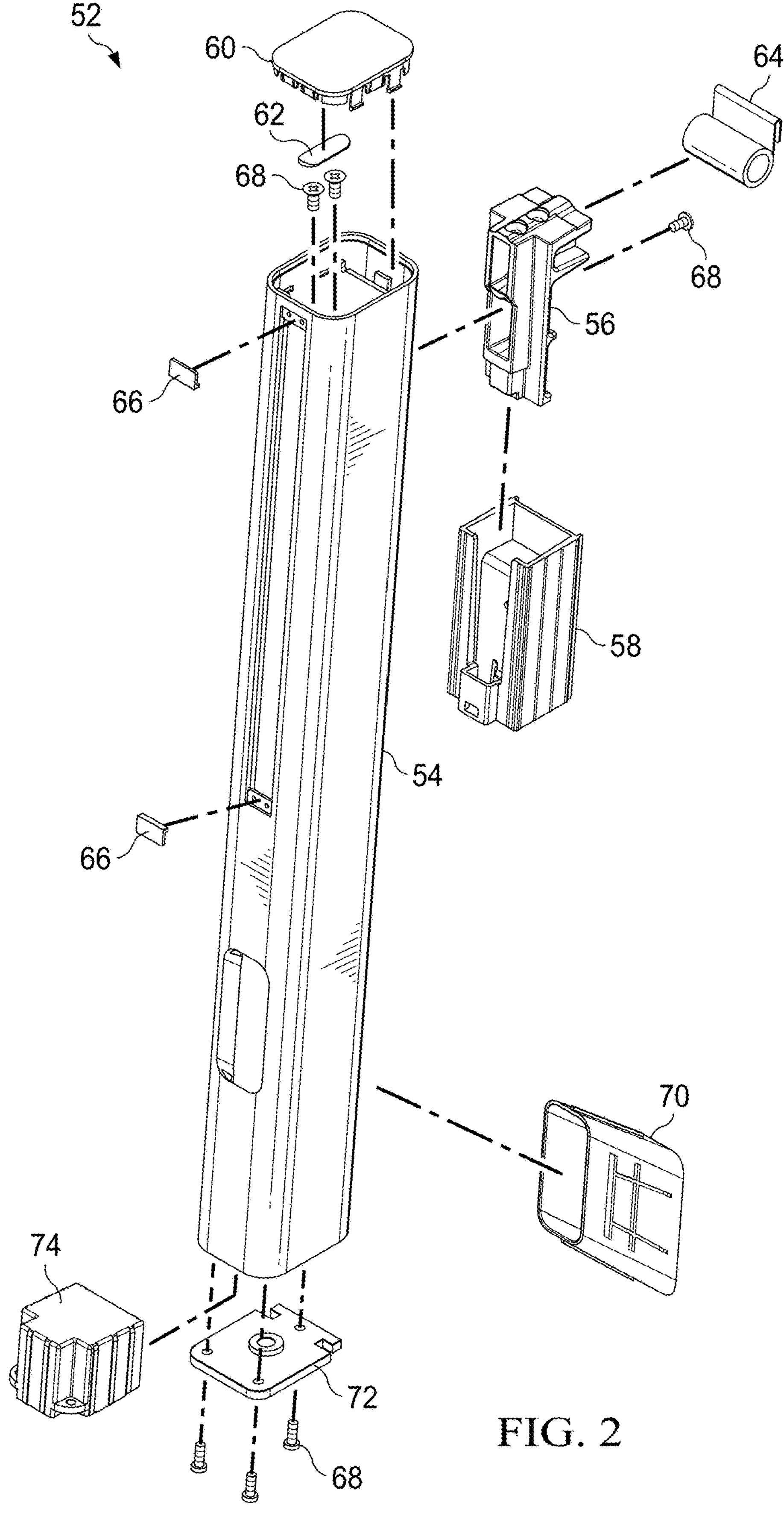
FIG. 2 depicts a side perspective exploded view of a riser having an example embodiment with dematerialized construction to adjust display assembly vertical height.

Referring now to FIG. 2, a side perspective exploded view of riser 52 depicts an example embodiment having dematerialized construction to adjust display assembly vertical height. Riser 52 significantly reduces the number of components compared with conventional risers by employing a few standard features while maintaining the vertical lift and articulation typically found in conventional display stands. To achieve a reduced component count, key features provided by the riser are combined into singular components that are leveraged to perform multiple functions. In particular, vertical articulation of a display assembly is managed by a single sliding member 58 that fits into the interior of riser 52 and is controlled by a single compression spring 64. A single hinge support member 56 couples onto sliding member 58 with a single screw for simple assembly and ease of disassembly. The materials of riser 52 separate on a component basis into individual material types to enhance reuse and recycling. In one example embodiment, the dematerialized riser is assembled with 16 components compared to 34 components of a conventional display stand riser.

In the example embodiment, a riser housing 54 is manufactured from extruded aluminum that includes interior features to guide sliding member 58. The extruded aluminum tube is machined to provide an opening in which a cable guide 70 inserts to provide space for routing power and display cables. For example, cable guide 70 is injection molded hard plastic, such as ABS, that snaps into position. Riser housing 54 is also machined to form a slot in the front face through which the display support inserts and travels vertically to adjust the display assembly height. Riser housing 54 is cover at a top side by an injection molded ABS cover 60 that snaps into place. Riser housing 54 has a base insert 74 that secures at a bottom end with a bottom cover 72 and three machine screws 68. Base insert 74 secures riser 52 to a base support as described in greater detail below. Rubber inserts 62 and 66 couple in the interior of riser housing 54 to define a range of motion of sliding member 58 and to cushion a stop at each end of the range of motion.

Sliding member 58 is formed by injection molded polyoxymethylene (POM), which provides a hard plastic material with a low friction that slides within the interior of extruded aluminum riser housing 54. A single injection molded piece is used and may be formed to have ridges that conform with ridges in the riser housing interior to act as guide rails. A rear side of sliding member 58 has a flat square surface that conforms against a flat surface at the rear interior of the riser housing. A front side of sliding member 58 is formed to accept the single hinge support member 56, which also engages in the slot at the front side of the riser housing and is held in place at the sliding member form by a single screw. Spring 64 is captured in place by hinge support member 56 within a cavity at the upper side of sliding member 58 so that spring force works against the sliding member and riser interior to hold the sliding member in place where a torsional force tilts the sliding member against the riser housing interior. Removal of the spring compression force by an interaction from the display assembly releases the sliding member to slide within the riser housing and adjust the display assembly height. At end of life, sliding member 58, hinge support member 56 and spring 64 readily separate for reuse or recycling with each individual component having just one material type. A sliding member of only one piece as depicted greatly dematerializes the riser and display assembly height adjustment compared to conventional solutions.

Figure 3:
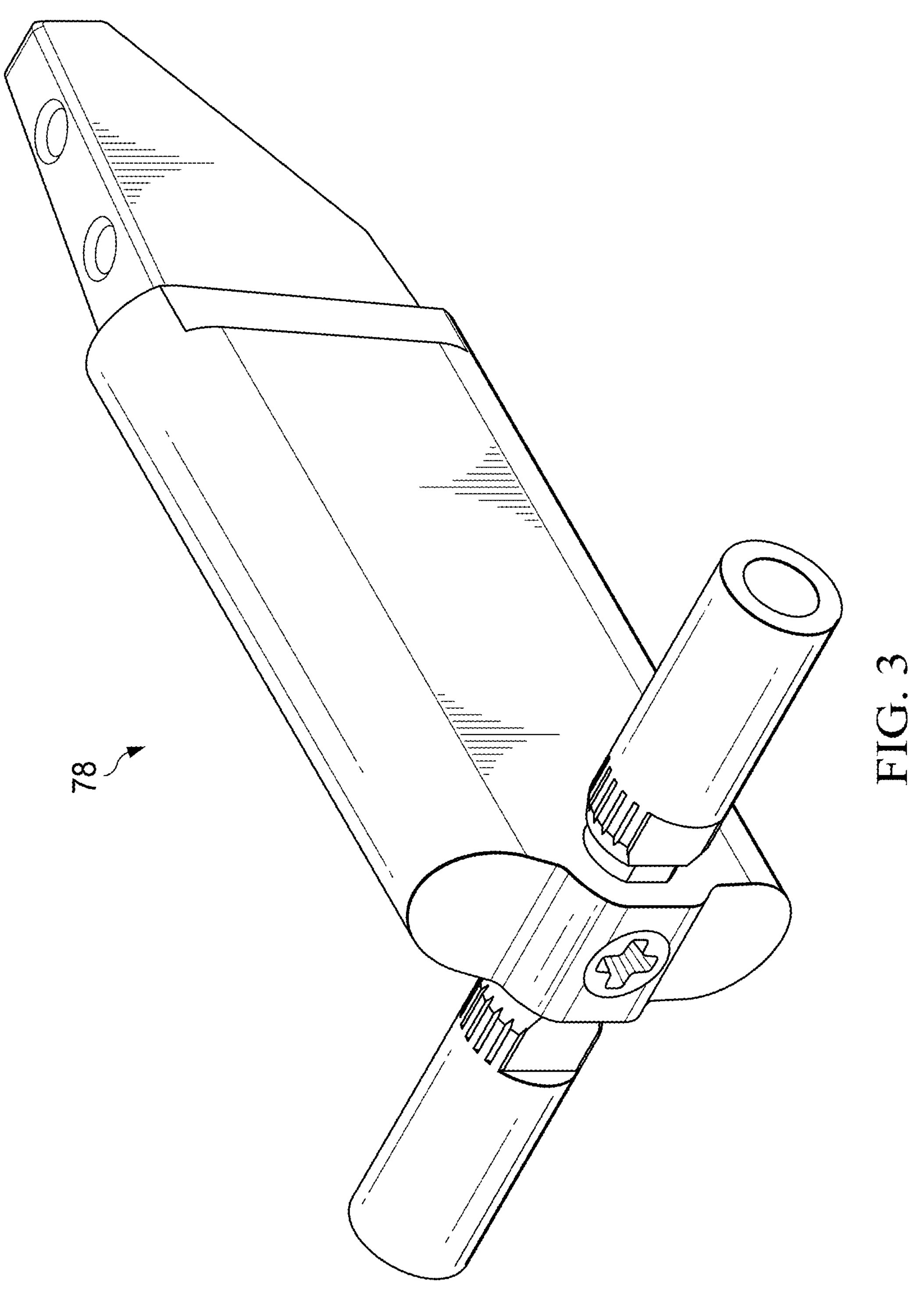
FIG. 3 depicts a side perspective view of a display bracket hinge assembled to support a modularized construction into a display stand pivot mechanism.

Referring now to FIG. 3, a side perspective view depicts a display bracket hinge 78 assembled to support a modularized construction into a display stand pivot mechanism. Display bracket hinge 78 has a steel body and a steel arm slid through an opening of the body and held in place by a single screw. The body couples to the height adjustment mechanism of the riser and the arm couples a rotating bracket assembly so that the rotating bracket assembly tilts by rotation of the arm. Friction to sustain a tilt position is integrated in the arm by a sleeve with minimal component parts and a common material for recycling at end of life. Display bracket hinge 78 fits into the rotating bracket as shown in FIG. 4 with a modularized complete subassembly of four steel parts that recycle as a chunk without further breakdown.

Figure 4:
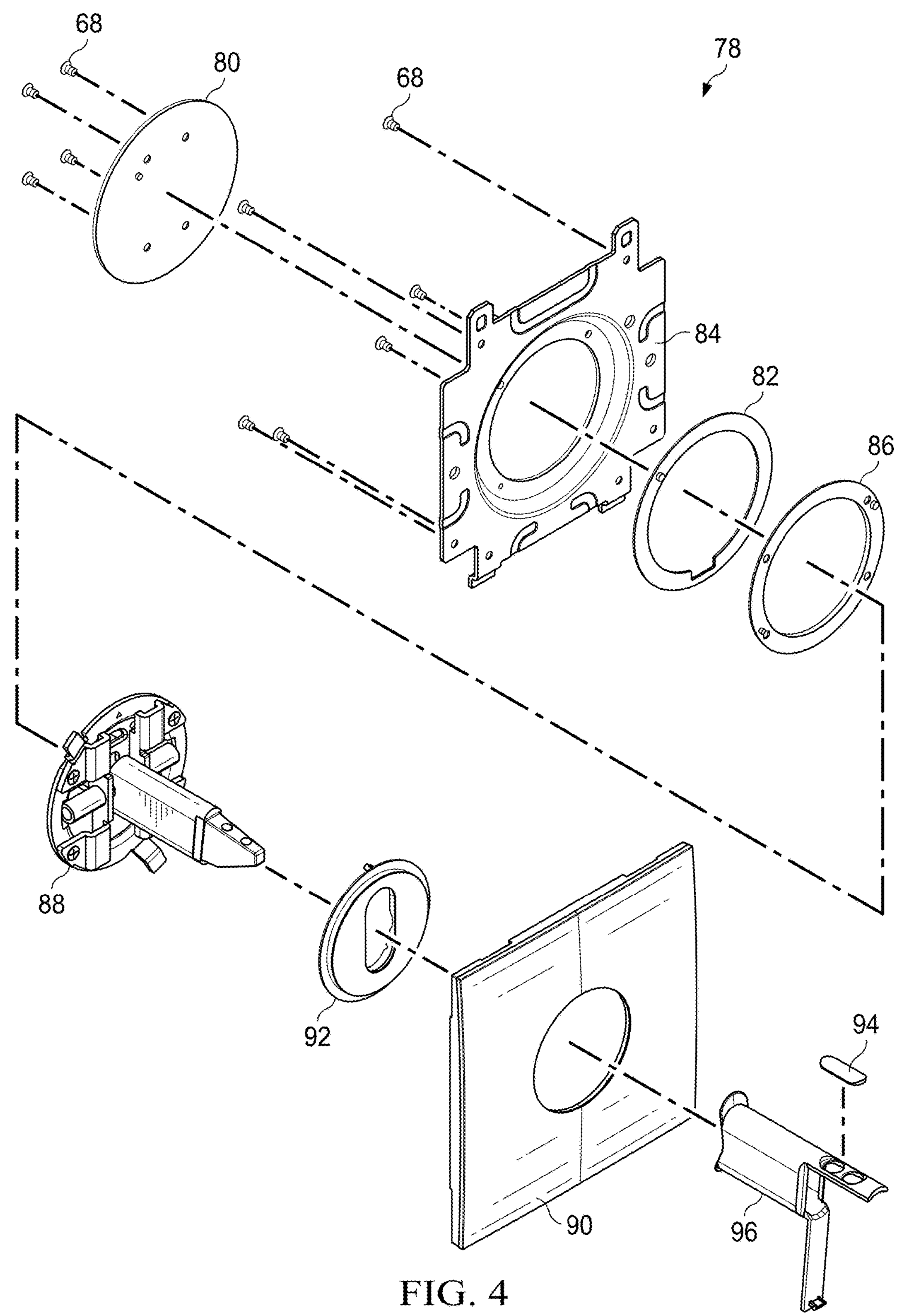
FIG. 4 depicts an upper side perspective view of a rotating bracket assembly that couples a display assembly to a riser with pivot and tilt functionality.

Referring now to FIG. 4, an upper side perspective view depicts a rotating bracket assembly that couples a display assembly to a riser with pivot and tilt functionality. In the example embodiment, display bracket hinge 78 couples into a modularized pivot assembly 88 having pivot bracket coupled to the arm of display bracket hinge 78 around which the display assembly rotates. Modularized pivot assembly 88 couples to the riser sliding member at the hinge support member described above by inserting a shaped end into a cavity of a riser bracket 96 and coupling the riser bracket to the hinge support member through a rubber buffer 94 and plural screws. Modularized pivot assembly 88 is captured between first and second covers 84 and 90 that conform to the VESA standard for accepting a display assembly. A pivot cover 92 at the riser bracket 96 isolates the modularize pivot assembly at cover 90. Pivot rings 82 and 86 and a pivot cap

80 couple with screws 68 to cover 84 so that the VESA connector portion rotates relative to modularized pivot assembly 88. In this manner, the hinge tilt mechanism and torque members are combined into a single component of pivot assembly 88 that uses only a single material of steel. For instance, modularized pivot assembly 88 is constructed of only steel parts that recycle as a whole without a need for further disassembly. The tilt function is built into display bracket hinge 78 as a single assembled member that does not have separate fasteners to attach a torque member, such as bolts and washers. Rotation of the display assembly between landscape and portrait orientations is provided by the pivot rings, which are constructed of hard plastic, such as injection molded polyoxymethylene (POM). The entire rotating bracket assembly uses only 27 components that are readily disassembled into recyclable portions as opposed to an example conventional rotating bracket assembly having 44 components.

Figure 5:
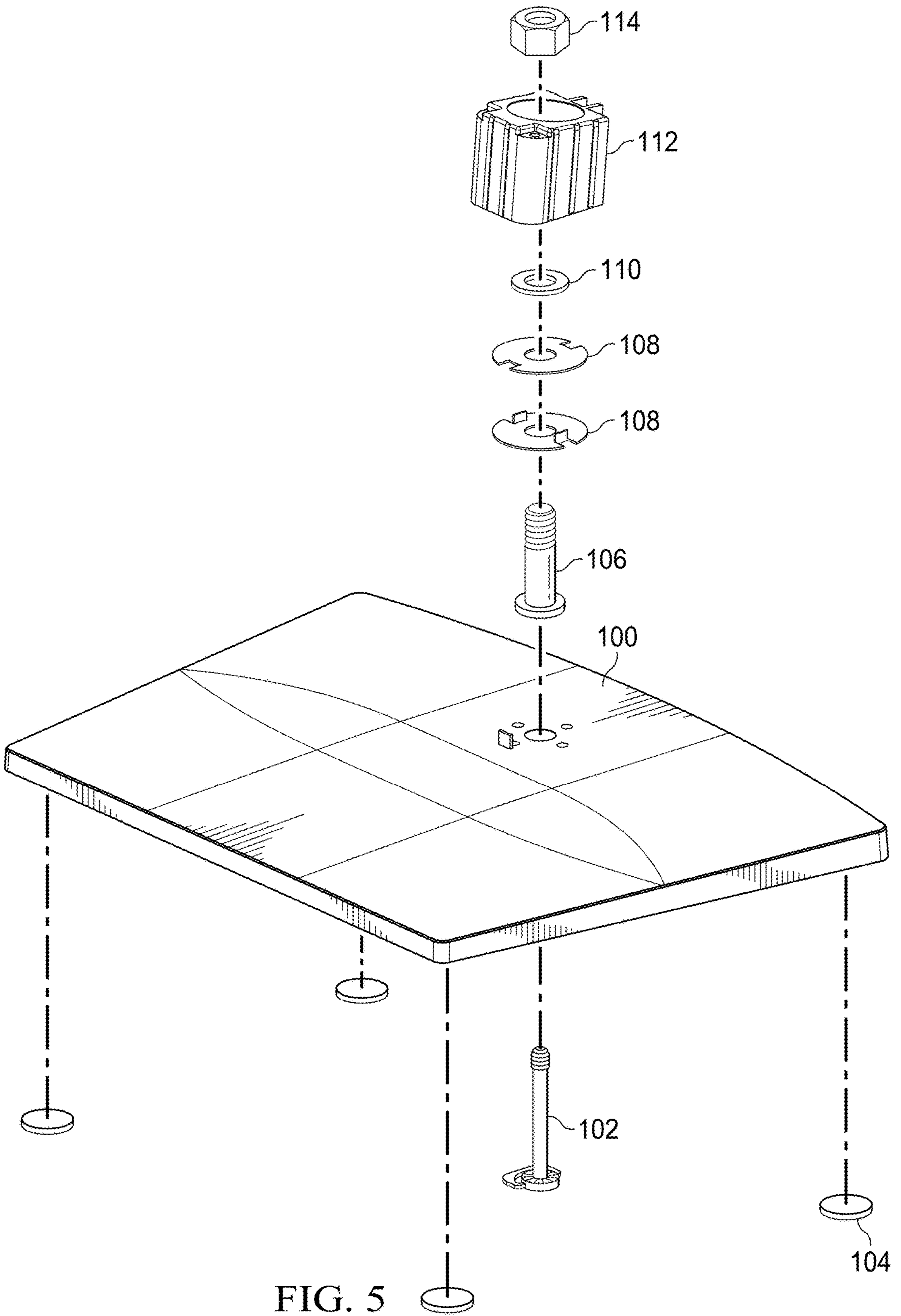
FIG. 5 depicts an upper front perspective view of an example embodiment of a display stand base that supports riser rotation.

Referring now to FIG. 5, an upper front perspective view depicts an example embodiment of a display stand base that supports riser rotation. In the example embodiment the display stand base has a base portion 100 formed from die cast of a single material to minimize assembly and disassembly steps with minimal number of screws to separate in portions of individual materials at recycling. The die cast base portion 100 integrates features to support riser rotation so that a base bulge that fits into a riser interior directly locks into position by a single axis and thumb screw arrangement. A nut 114 locks into a cavity of a riser insert 112 at a top side. An arrangement of swivel washers 108 and 110 insert onto axis 106 that has a channel to accept a thumbscrew 102 to lock the axis to base portion 100. When a riser fits over riser insert 112, riser insert 112 rotates with the riser to change a viewing axis of a display assembly coupled to the riser. Swivel washers 108 and 110 provide a rotational support surface around which the riser insert turns. Rubber feet 104 couple to the bottom surface of base portion 100. The 15 components for the display stand base compare to a conventional display stand that has 29 components.

Figure 6:
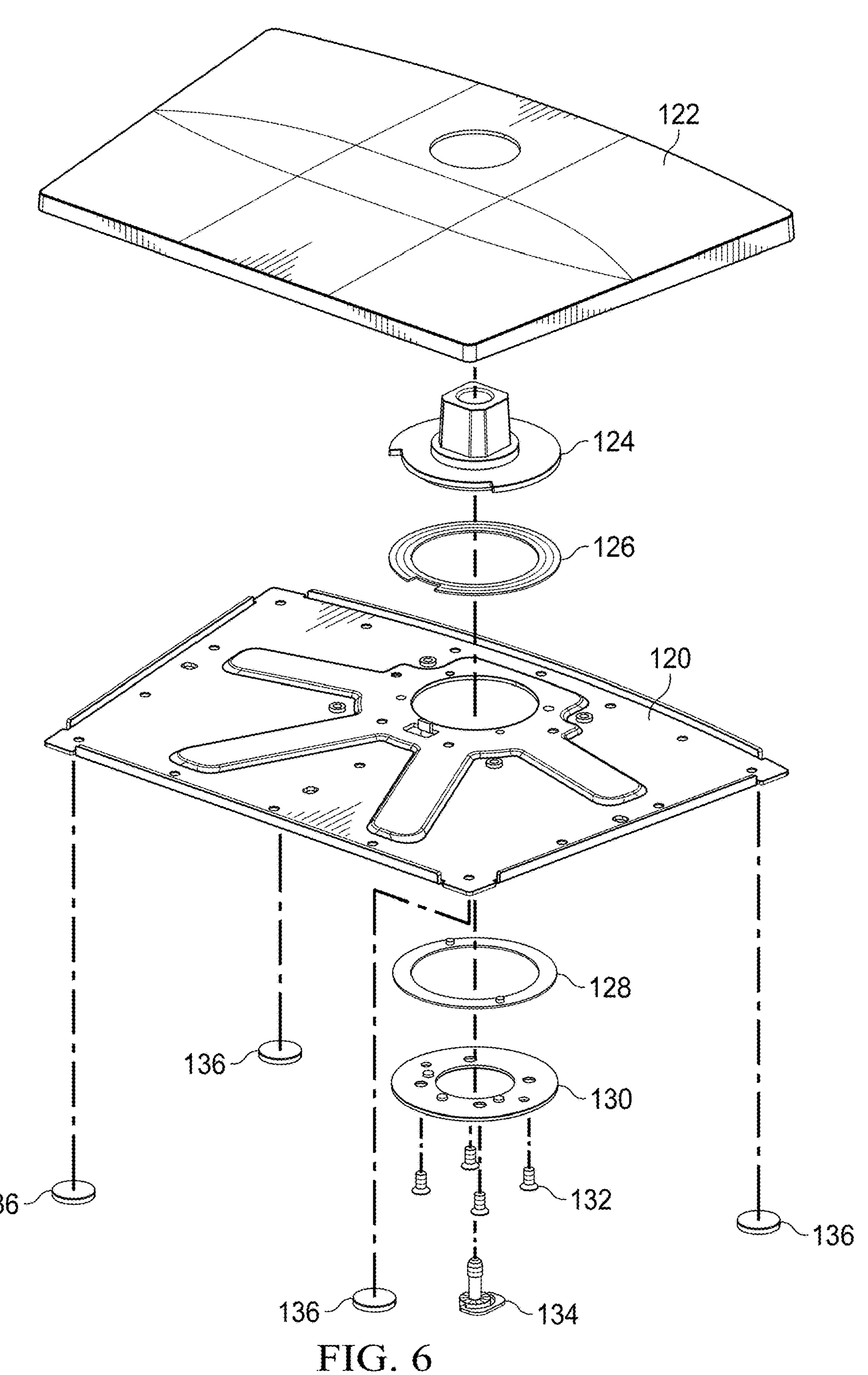
FIG. 6 depicts an upper front perspective view of an alternative example embodiment of a display stand base that supports riser rotation.

Referring now to FIG. 6, an upper front perspective view depicts an alternative example embodiment of a display stand base that supports riser rotation. In the example embodiment, separate base portions 120 and 122 assemble to capture riser insert 124 between them so that riser insert 124 extends upward through upper base portion 122 to insert into a riser interior. POM injection molded swivel rings 126 and 128 fit between the bottom of riser insert 124 and a coupling ring 130 to provide a reduced friction interface for rotation of riser insert 124. Coupling ring 130 compresses against the bottom side of bottom base portion 120 to capture swivel rings 126 and 128 when screws 132 engage upper base portion 122. A single coupling insert 134 enters the riser from below base portion 120 to couple the riser to riser insert 124. Feet 136 couple to the bottom surface of base portion 120 to cushion the display stand from a desktop. Similar to the example embodiment of FIG. 5, the display stand base of FIG. 6 assembles with 15 components compared to 29 components of a conventional display stand base.

Figure 7:
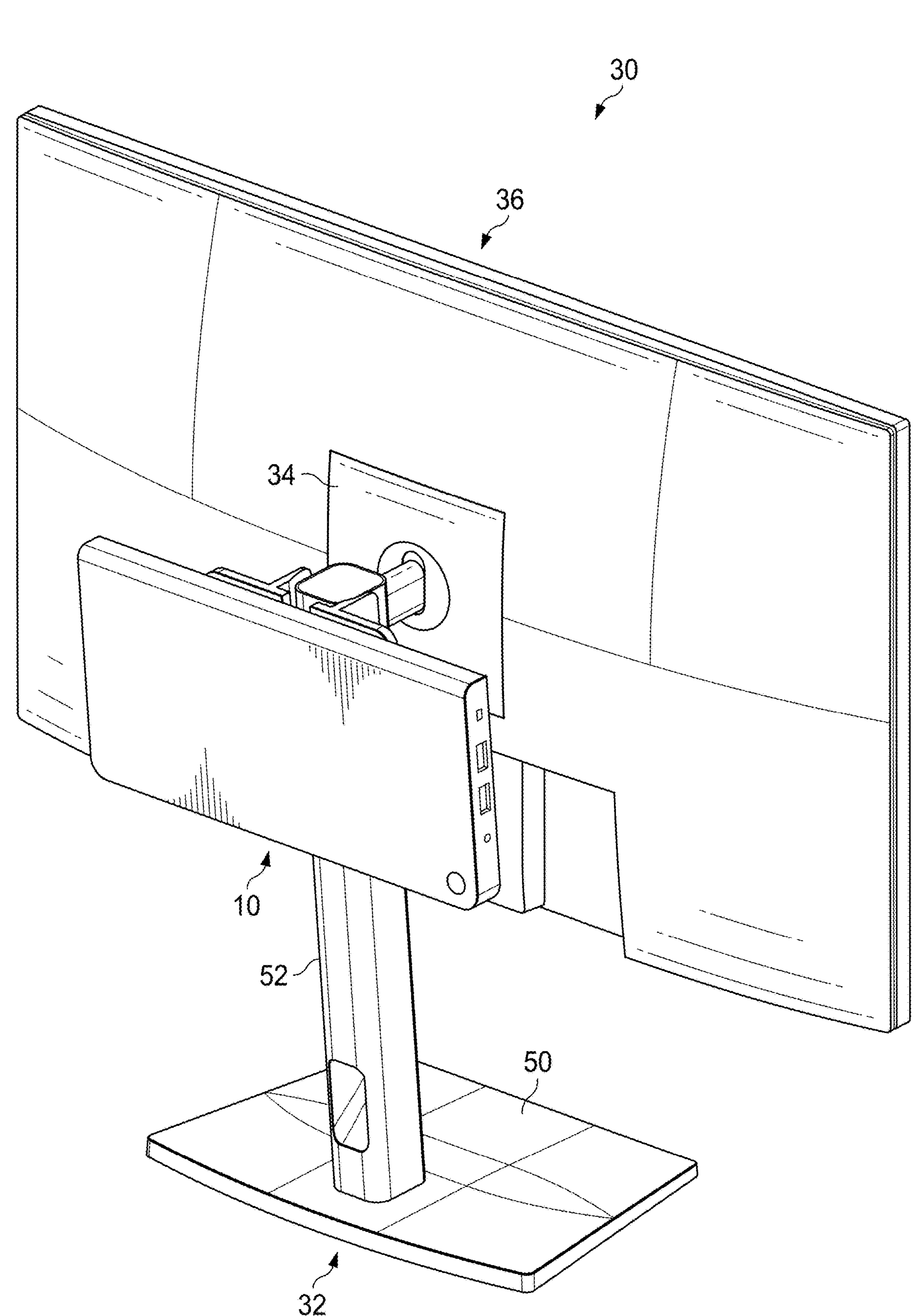
FIGS. 7, 7A, 7B, 7C, and 7D depict a dual purpose information handling system mount and stand.
Figure 7A:
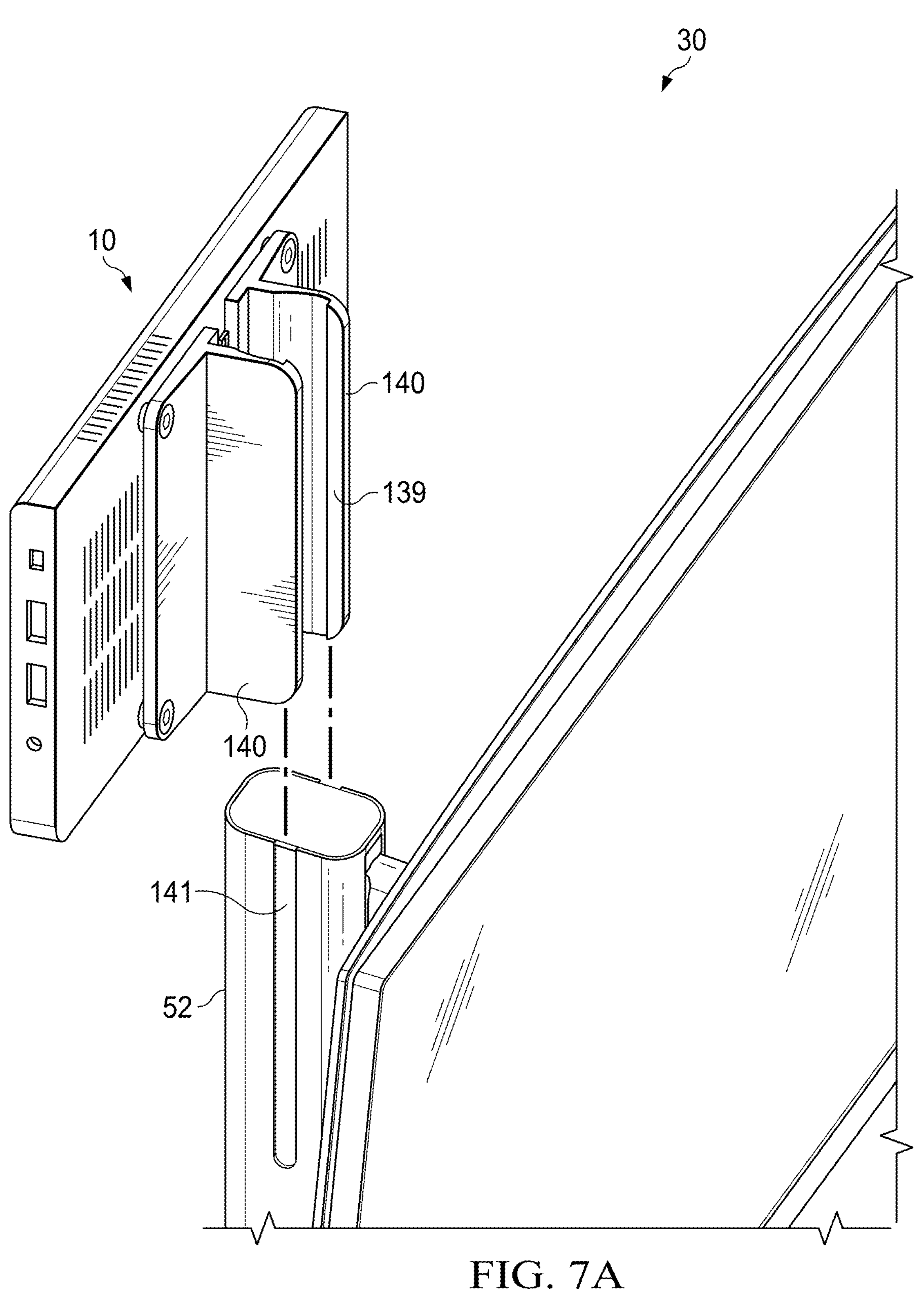
Figure 7B:
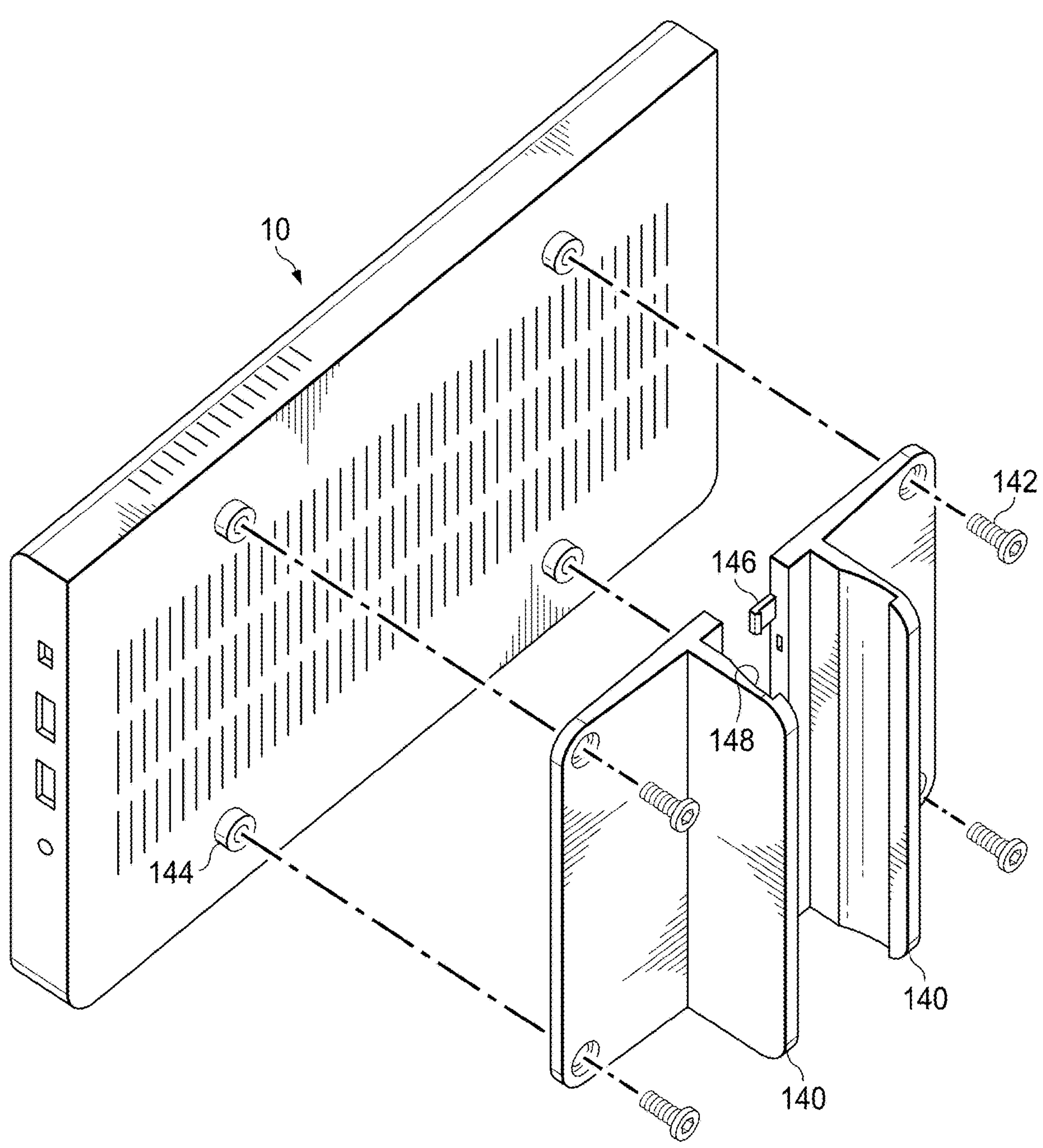
Figure 7C:
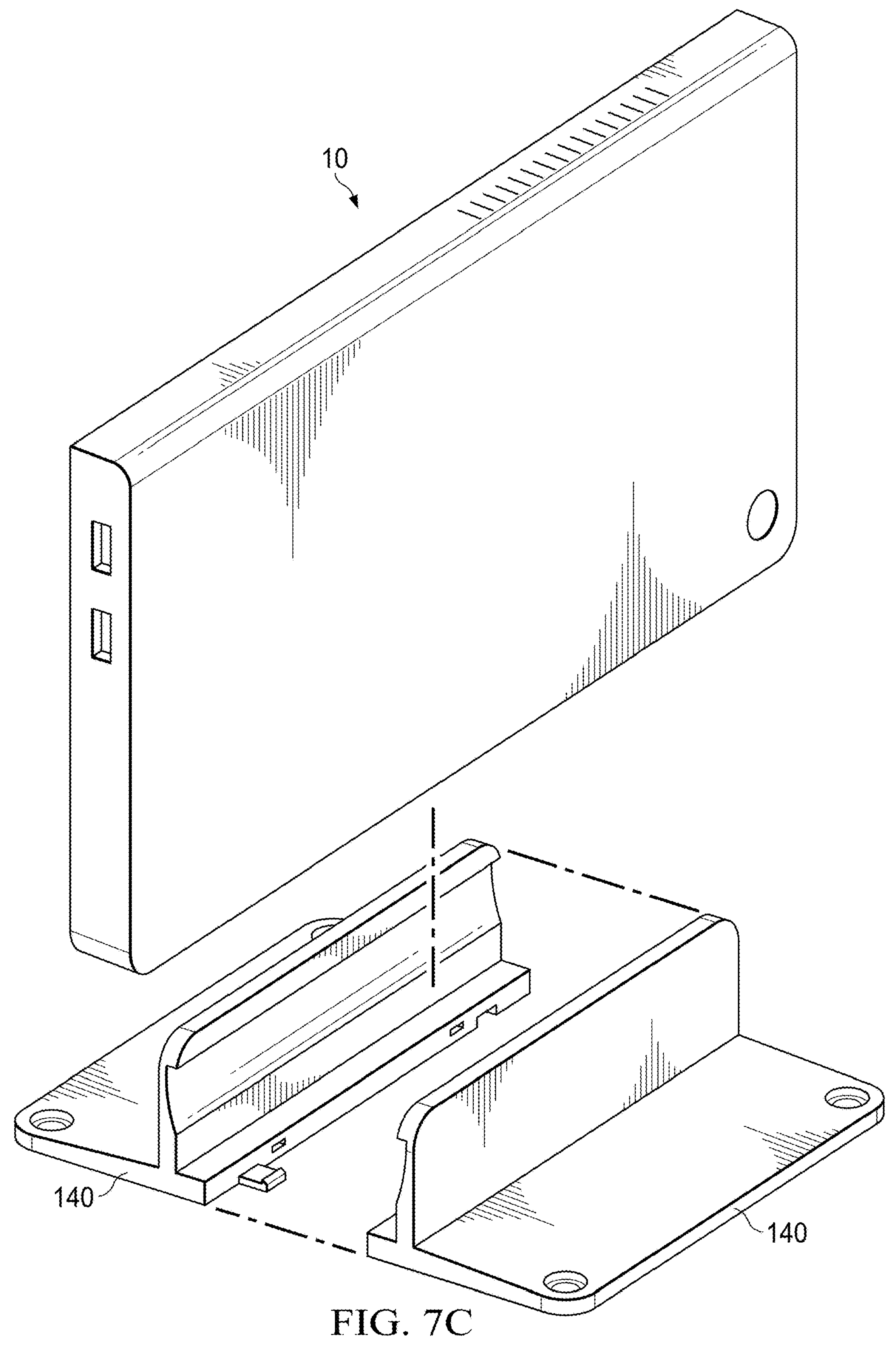
Figure 7D:
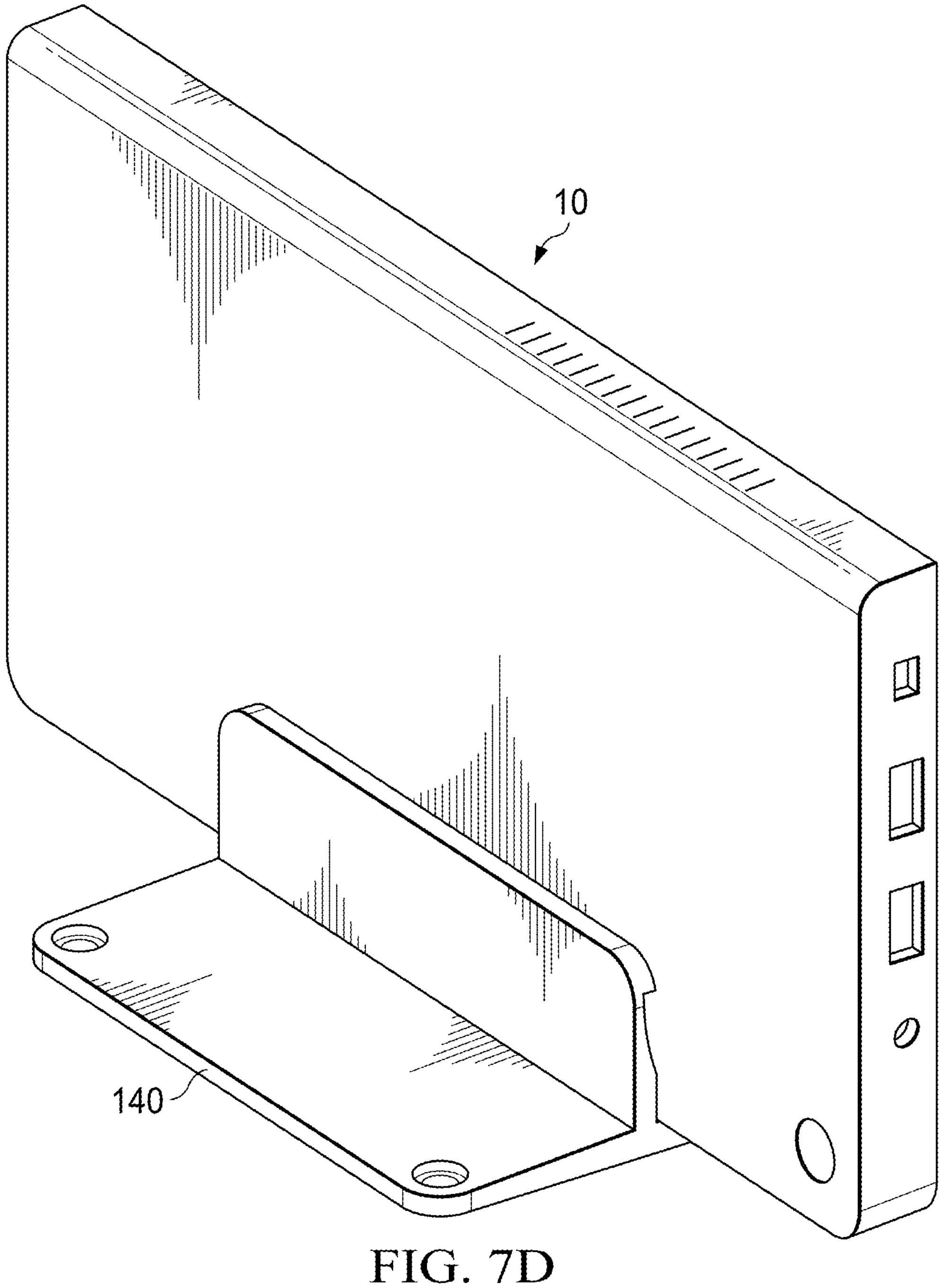

Referring now to FIGS. 7, 7A, 7B, 7C, and 7D, a dual purpose information handling system mount and stand is depicted. When a desktop information handling system has a small footprint, mounting the desktop housing on a rear side of a peripheral display offers a convenient solution that conserves desktop area and a ready management of cables routed for power and communication. FIG. 7 depicts a rear side view of a peripheral display 30 having a display assembly 36 coupled to a display support 34 and held in a raised position by a riser 52 coupled to a base 50. An information handling system 10 couples to the rear side of riser 52 with a pair of brackets 140 screwed into the back side of information handling system 10. FIG. 7A illustrates an example embodiment having brackets 140 with rail features 139 that engages guide features 141 formed on the outer surface of riser 52 to slide down the riser to a resting position. FIG. 7B depicts removal of brackets 140 by unscrewing screws 142 from threads 144 in the information handling system rear side. On an inside surface of one bracket 140 a tab 146 extends out towards a slot 148 formed in the opposite bracket 140. When the two brackets are pushed together as shown in FIG. 7C, a stand is defined that has a width to accept information handling system 10. FIG. 7D depicts information handling system 10 resting in the stand defined by the separate brackets when pressed together to form the stand. The stand configuration readily repurposes to a display mount by separating the bracket tab and slot assembly and screwing the brackets back on the information handling system rear side. A rail feature extending out from the interior side of the brackets into groove guides of the riser engage with the riser to slide the information handling system back to a mounted position.

Figure 8:
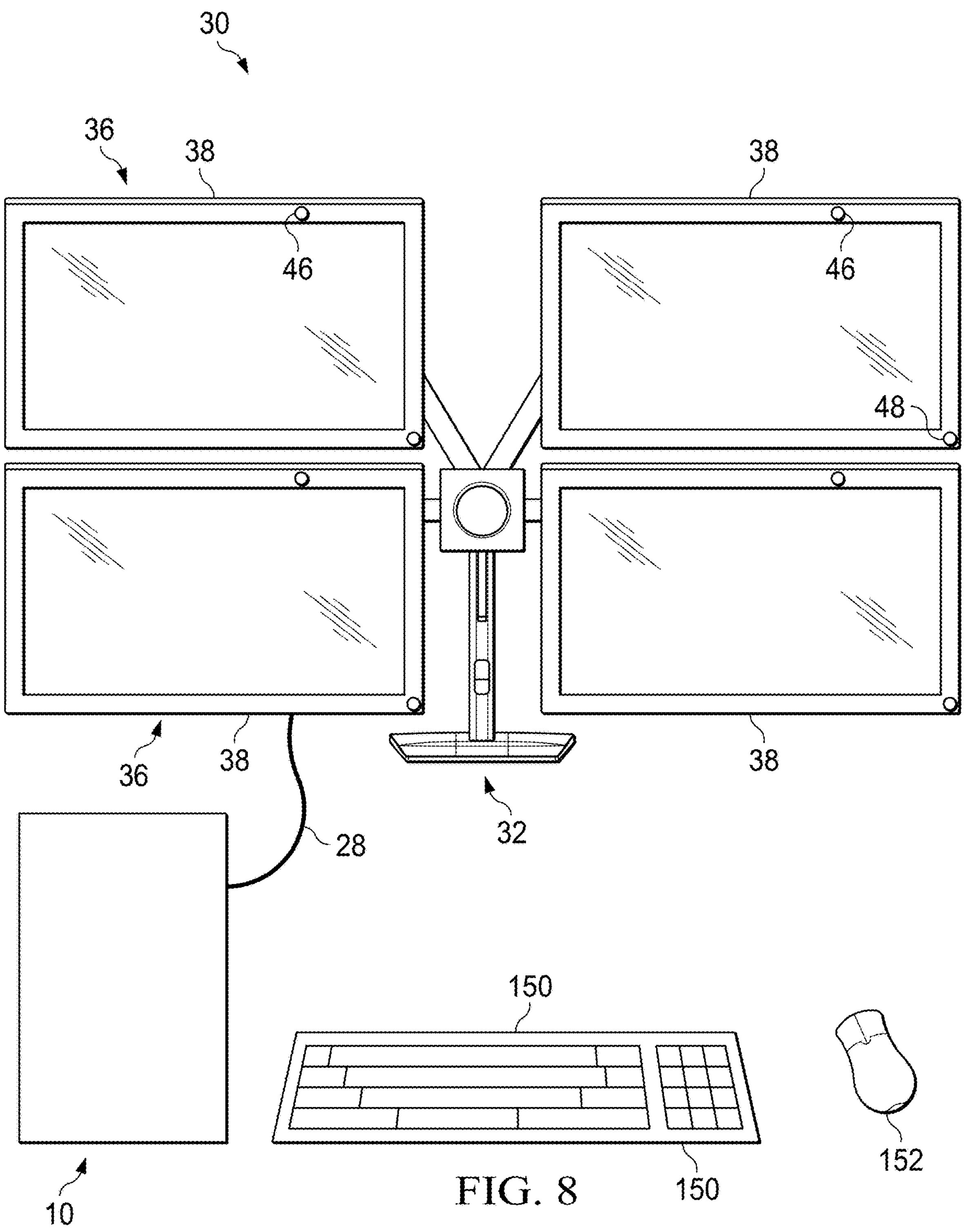
FIG. 8 depicts a multi-display configuration for a display stand and depicts embodiments for adjusting display operations based upon end user interactions and display location.

Referring now to FIG. 8, a multi-display configuration for a display stand depicts embodiments for adjusting display operations based upon end user interactions and display location. In the example embodiment, a peripheral display 30 presents visual images of an information handling system 10 through one or more display cables 28 with four display panels 38, each coupled to one display stand 32 as a display assembly 36. An end user makes inputs through a keyboard 150 and mouse 152 to an application and operating system executing on information handling system 10. The operating system typically has a way to assign visual image presentation and inputs to a particular display panel 38, such as by numbering the display panels in a setup and having an end user select which display panel presents what information. Display assemblies 36 may come with accessories to include cameras, time of flight user presence detection sensors, eye tracking sensors 46 and accelerometers 48. The large display area available is often helpful to an end user who is tracking different information sources, however, the setup of the display can be daunting, especially when an end user is visiting a desktop worksite on a temporary basis, such as in a work cube at an office location that the end user interfaces through a portable information handling system.

Figure 9:
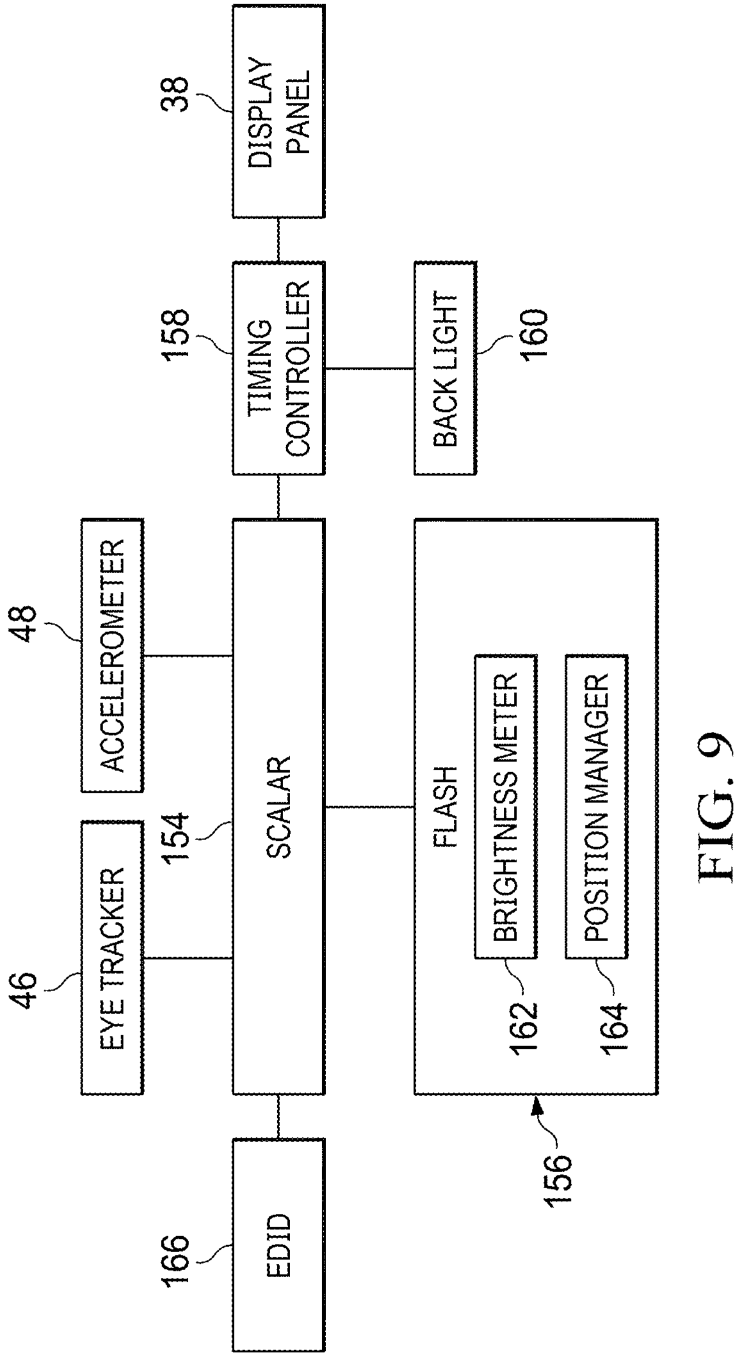
FIG. 9 depicts a block diagram of logical elements that present visual information at a display assembly to adjust display operations in a multi-display configuration.

Referring now to FIG. 9, a block diagram depicts logical elements that present visual information at a display assembly to adjust display operations in a multi-display configuration. Display panel 38 has visual images presented at pixels by a timing controller 158 that scans the pixel values to the pixel array. A backlight 160 illuminates the backside of the display panel to present the visual images when a liquid crystal display (LCD) panel is used. Alternatively, an organic light emitting diode (OLED) display film directly illuminates light in response to an electric field. A scalar 154 includes a processing resource that manages visual image presentation, such as by scaling visual images received at the display to a resolution appropriate for the display panel. EDID 166 in non-transitory memory that stores parameters used to present the visual images, such as the display panel resolution, color depth, data input type and other factors defined by a VESA Extended Display Identification Data standard format. Scalar 154 interfaces with a flash memory 156 or other non-transitory memory, that stores instructions for execution to manage display operations. Display panel accessories interface with scalar 154, or a similar processing resource of the display, to manage accessory operations. In the example embodiment, an eye tracker sensor 46 monitors end user gaze to determine when the end user directs the gaze at the display panel. An accelerometer 48 tracks the display panel orientation, such as landscape and portrait orientations.

In the example embodiment, a brightness manager stored in flash memory 156 and executed on scalar 154 manages illumination of backlight 160 based upon sensed end user interactions by eye tracker sensor 46. When one of the display panels 38 are not viewed for a predetermined time period, brightness manager 162 dims the backlight illumination and, after a sufficient time, turns off the backlight if the end user context indicates the display panel is not in use. In the example embodiment, the determination is made at each display assembly by instructions running on the scalar, however, in alternative embodiments the sensed end user interactions may be communicated to the information handling system to determine the brightness manager determinations. The context of the display viewing may include a variety of factors that are applied to adjust individual display panel brightness in a multi-display configuration. One example is a mouse or keyboard interactions by an end user. For instance, if an end user is active at the information handling system with key or mouse inputs but one or more of the displays do not detect inputs made at its content, then the amount of time that the eye tracker fails to detect a gaze at the display panel is reduced before the brightness is decreased or turned off. As another example, an idle screen may be detected by the scalar monitoring changes to the display buffer so that a lack of changes to information presented at the display decreases the amount of time before the display goes idle. In one alternative embodiment, the information handling system monitors context and communicates an activity level to the individual displays that adjusts the idle gaze time detected at each display panel before brightness is decreased. As a result of the display panel activity monitoring, one or more of the display panels may dim or turn off brightness at different times and different levels of inactivity while an end user continues to interact with one or more display panels having normal brightness.

In the example embodiment, a position manager 164 tracks the position and orientation of a display assembly on a display stand and stores the position for subsequent access by an information handling system. Position manager 164 obtains the position of the display assemblies during a setup by an end user or with analysis of end user interactions at the display panels. For instance, in the example embodiment of FIG. 9, position manager 164 assigns the display panels a position of upper left, upper right, lower left and lower right, and then stores the position of each display locally in EDID 166 of the display. When an information handling system first interacts with the peripheral display, each display assembly provides its position form EDID to the information handling system and the information handling system presents visual images according to the downloaded positions. In one embodiment, the position information may also include orientation information, such as landscape or portrait. If the information handling system detects a different position, the EDID information is updated for use by the next end user interaction.

Figure 10:
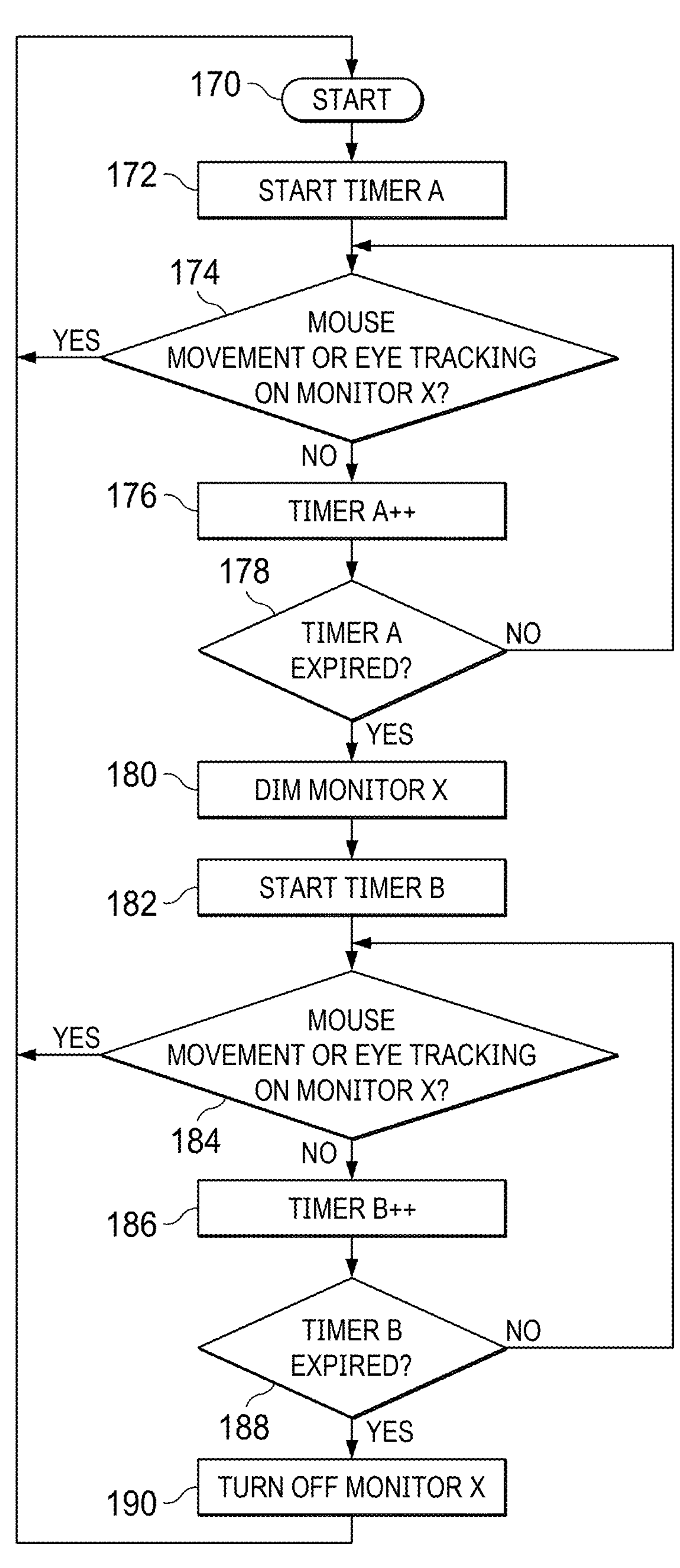
FIG. 10 depicts a flow diagram of an example process for intelligent multi-display assembly automated dimming and turning off display visual image presentations at a peripheral display having a display stand that supports plural display assemblies.

Referring now to FIG. 10, a flow diagram depicts an example process for intelligent multi-display assembly automated dimming and turning off display visual image presentations at a peripheral display having a display stand that supports plural display assemblies. The process starts at step 170 and may execute at each scalar of each display assembly or as a separate thread for each display assembly at a processing component of an information handling system interfaced with the display stand, such as a separate thread for each display assembly executed on the embedded controller. At step 172 a timer is started to track time in a detected display presentation state and context. The length of the timer may depend on the display context as described above. At step 174 a determination is made of whether mouse movement or eye tracking is detected for the display assembly and, if so, the process returns to step 170 to restart monitoring. If no eye tracking or mouse movement is detected at step 174, the process continues to step 176 to increment the timer. At step 178 a determination is made of whether the timer has expired. If yes, the process continues to step 180 to dim the display assembly brightness. If the timer has not expired at step 178, the process returns to step 174 to continue monitoring mouse movement and eye tracking.

At step 182, once the first timer has expired a second timer is started to track time to turn off the display assembly. The length of the second timer may also vary based upon context as described above. As an example, a shorter timer might be applied if another display assembly nearby is idle, or a longer timer might be applied if another display assembly is in active use. Such an arrangement can allow an end user to have a more rapid recovery of full display assembly use from a dim illumination while helping to focus on an active display panel presentation. At step 184, mouse movement and eye tracking is monitored to detect end user interaction with the display assembly. If eye tracking or mouse movement are detected, the process returns to step 170 to reset the display assembly to full brightness and start the first timer. If no eye tracking or mouse movement is detected at step 184, the process returns to step 186 to increment the second timer. At step 188 a determination is made of whether the second timer has expired. If not, the process returns to step 184 to continue monitoring eye tracking and mouse movement. If not, the process continues to step 190 to turn off the display assembly display panel. Once the display panel is off, a restart of the display panel to present visual images may be restarted at either step 170 or 182 depending upon the context at the restart. For instance, end user activity at one of the four display assemblies may restart an adjacent display panel in a dim presentation. Although the example embodiment has four display assemblies controlled by one desktop information handling system, alternative embodiments may have more or few display assemblies and may have inputs from plural information handling systems, such as with a KVM switch. Managing display assembly brightness individually at each display assembly of a display stand, such as with a scalar, offers individualized control for a better end user experience and reduced power consumption.

Figure 11:
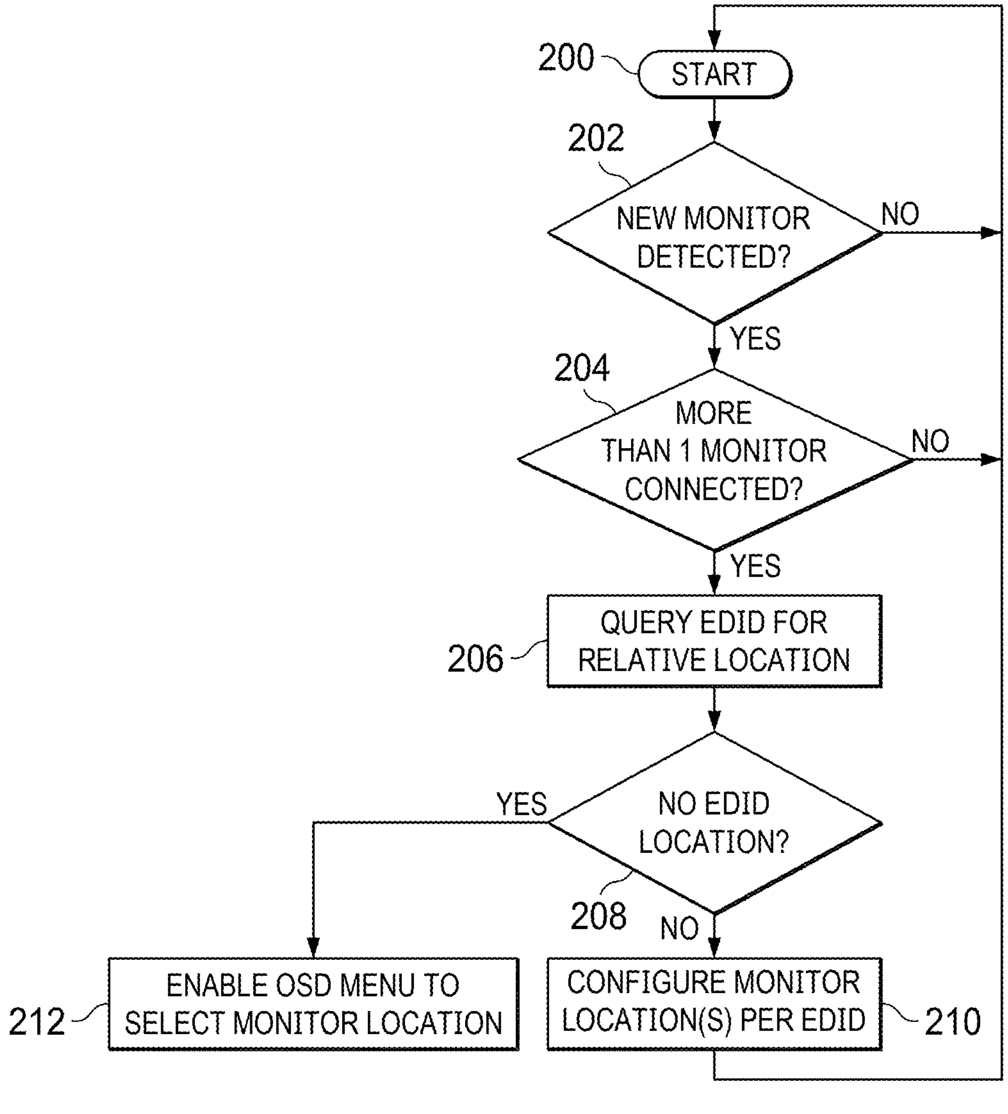
FIG. 11 depicts a flow diagram of an example process for monitoring display assembly locations in a peripheral display having a display stand that supports plural display assemblies.

Referring now to FIG. 11, a flow diagram depicts an example process for monitoring display assembly locations in a peripheral display having a display stand that supports plural display assemblies. The process starts at step 200 and continues to step 202 to determine if a new display assembly is detected coupled to the display stand. Detection may include a physical sensor coupled to the display stand and may be performed by an information handling system or by a scalar of one or more of the display assemblies coupled to the display stand. For example, the display assemblies may each interface through a separate cable to an information handling system or with a daisychain arrangement as is supported by DisplayPort. If at step 202 no new display assembly is detected, the process returns to step 200. If at step 202 no new display assembly is detected coupled to the display stand, the process continues to step 204 to determine if more than one display assembly is coupled to the display stand. If only one display assembly is coupled to the display stand, the process returns to step 200. The detection of multiple display assemblies can be performed by an information handling system or a scalar one or more of the display assemblies, as described above. When more than one display assembly is detected at the display stand, the process continues to step 206 to query EDID of the display assemblies to retrieve the relative position of each display assembly. The relative position is then applied for end user interactions with the display assemblies, such as how a mouse cursor tracks or how adjacent visual images are presented at the display panels. At step 208 a determination is made of whether EDID lacks the location information for the display assembly. If so, the process continues to step 212 to enable the onscreen display menu to select a display assembly location through the display scalar and then store the location in the EDID. Alternatively, the display assembly location may be selected by interactions through an information handling system. If an EDID location is detected, the process continues to step 210 to configure the display assembly location per the EDID location information. In one embodiment, a confirmation of the location of the display assemblies may be performed at the display assemblies for the display stand in the event that the location has changed since a previous power on event of the display assembly. Although the example embodiment depicts four display assemblies in a square arrangement, a linear arrangement may be used and, in some embodiments, the display stand may support movement of the display assemblies relative to each other so that locations may change even though the display assemblies are not removed from the display stand.

Referring now to FIGS. 12, 12A, 12B, 12C and 12D, an example embodiment depicts a display stand mechanical feature to track location of a display assembly on a display stand that supports plural display assemblies. In the example embodiment, the display assembly sensor has two components, a contact pad 224 and a contact head 220 that has three spring biased contacts aligned to interface with conductive material on the contact pad 224. In various embodiments, contact head 220 may be coupled to the display assembly and contact pad 224 may be coupled to the display stand; or alternatively, contact head 220 may be coupled to the display stand and contact pad 224 may be coupled to the display assembly. In the example embodiment, contact pad 224 couples to the back side of a display assembly and contact head 220 couples to each display assembly position of the display stand. Contact pad 224 interfaces with the display assembly scalar and applies signals generated by interaction with contact head 220 spring biased pins to determine when the display assembly couples to the display stand, what position the display assembly couples to at the display stand, and the rotational orientation of the display assembly at the display stand. When the display stand interfaces with an information handling system, the contact head may also communicate position information to the information handling system for each display stand position.

Figure 12:
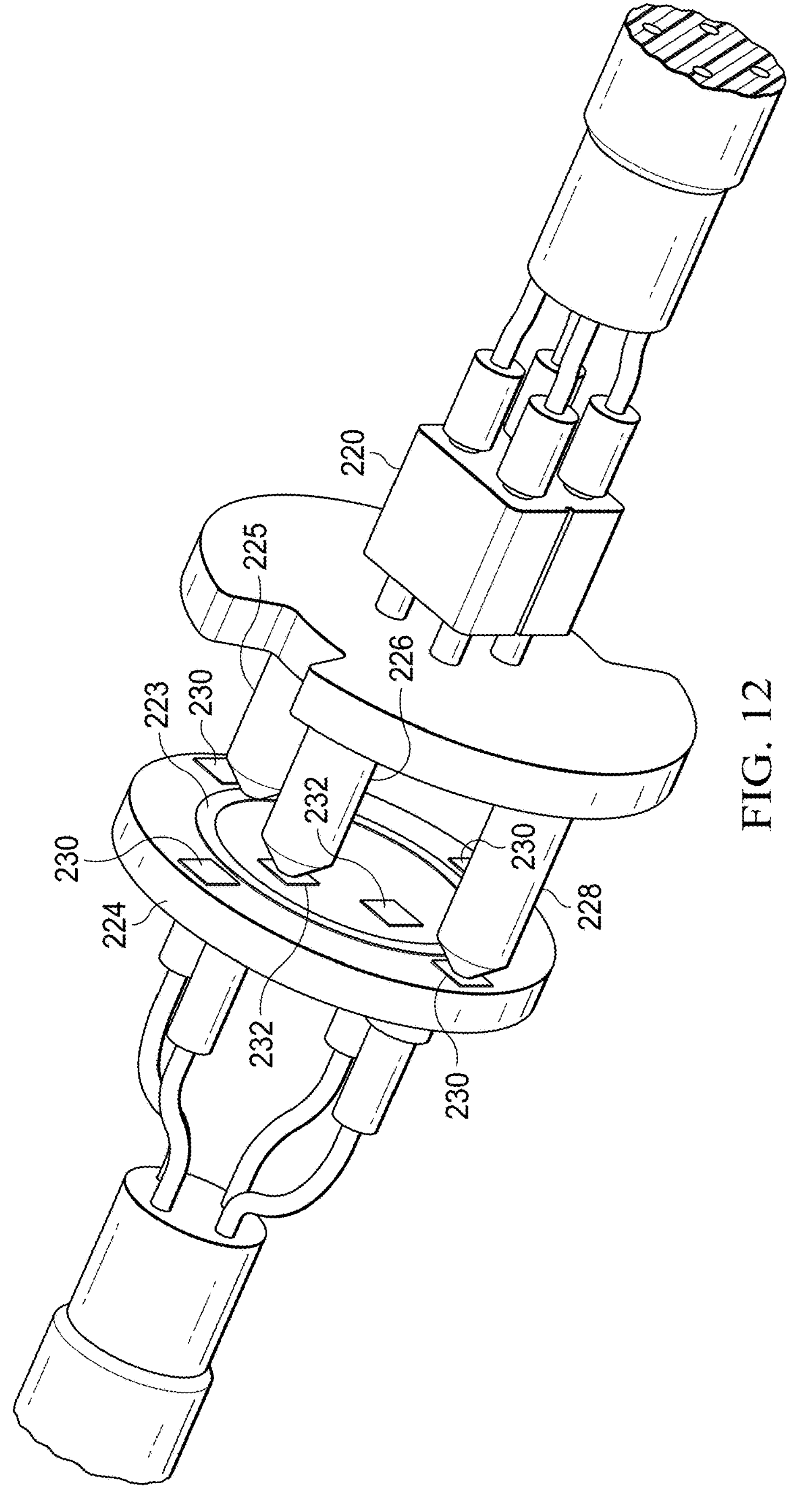
FIGS. 12, 12A, 12B, 12C and 12D depict an example embodiment of a display stand mechanical feature to track location of a display assembly on a display stand that supports plural display assemblies.
Figure 12A:
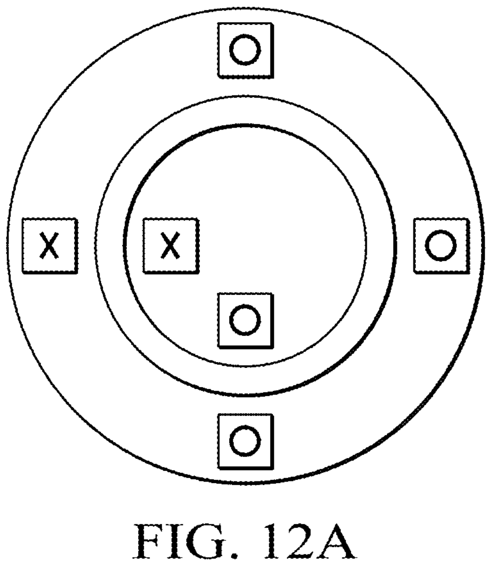
Figure 12B:
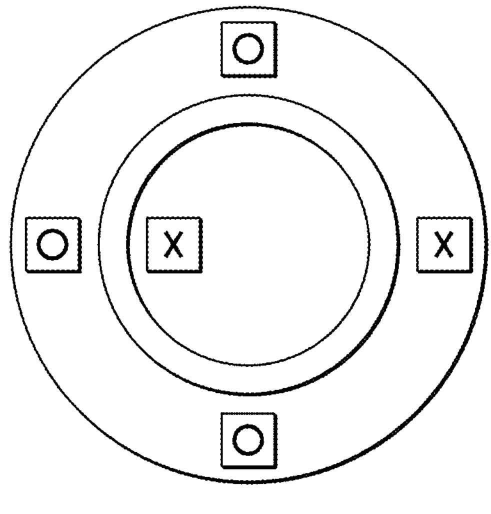
Figure 12C:
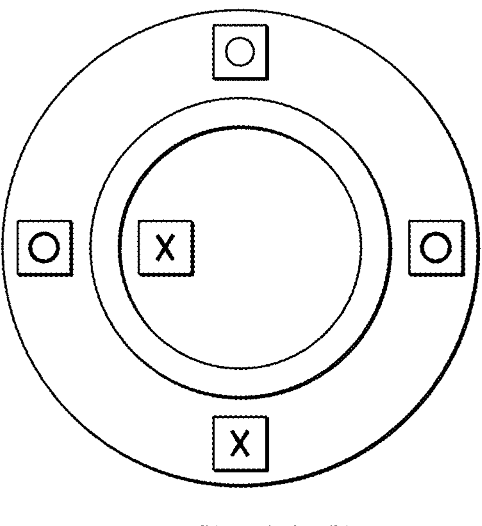
Figure 12D:
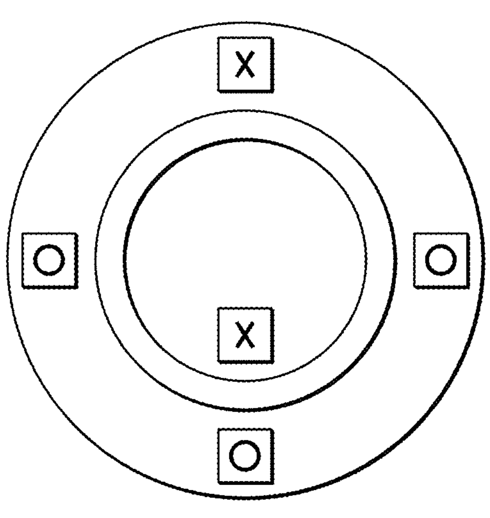

The three spring biased contacts interface with the contacts and/or concentric ring to rotate to different relationships relative to each other based upon display assembly position and orientation to provide position information for the display assembly relative to the display stand. At an initial contact, a transfer of a signal between a presence pin 225 and a concentric ring contact 223 provides information to the display assembly and/or information handling system about which display support the display couples onto. In the example embodiment, presence ring is a signal return to complete a circuit for position contact pads 230 and rotation contact pads 232. A position pin 228 aligns with one of four position contact pads 230 to indicate the display stand position that the display assembly couples to. A rotation pin 226 aligns with one of two rotation contact pads 232 to indicate to the display assembly the rotational orientation of the display assembly at the display stand. For example, with a four position display stand, each display stand position has a single position pin 228 in a unique position to align with a single position pad 230 at position P1, P2, P3 and P4. Each display stand position has a rotation pin 226 aligned to contact a first rotation pad 232 when the display assembly is in a landscape orientation and a second rotation pad 232 when the display assembly rotates to a portrait orientation. The position pad that contacts the position pin will rotate based upon which orientation the display assembly has. FIG. 12A through 12D depict one example embodiment of feedback provided from the position sensor and rotation sensor for display assemblies coupled at different positions of a display stand having four positions such as that of FIG. 8. FIG. 12A depicts a position and rotation pin contact when a display assembly couples in an upper left position with a landscape orientation. FIG. 12B depicts a display assembly coupled in a lower right position and landscape orientation. FIG. 12C depicts a display assembly in a lower left position and landscape orientation. FIG. 12D depicts a display assembly that is rotated counterclockwise to a portrait orientation in a lower right position. The position pin contacts a different position pad when rotated to the landscape versus the portrait orientation. In various embodiments, different pin and contact pad positions may be used, and different arrangements of display assemblies may be supported, such as a linear arrangement.

Figure 13:
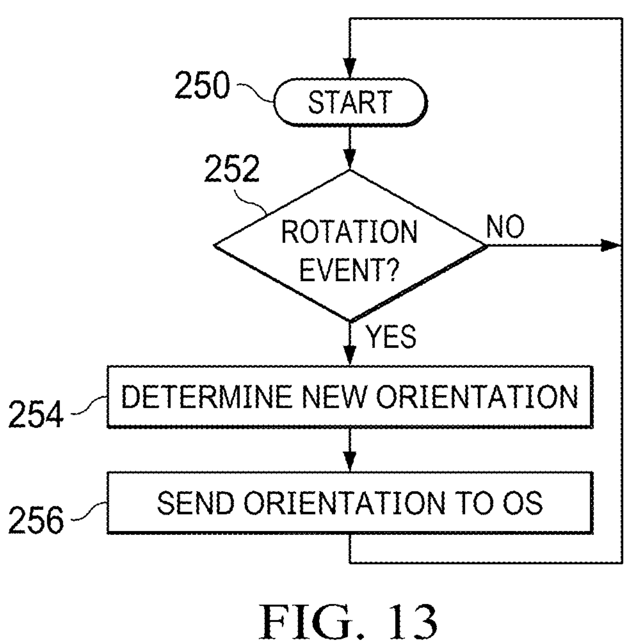
FIG. 13 depicts a flow diagram of a process for dynamic selection of portrait and landscape modes to present visual images at each independent display assembly with visual images that match the display assembly orientation.

Referring now to FIG. 13, a flow diagram depicts a process for dynamic selection of portrait and landscape modes to present visual images at each independent display assembly with visual images that match the display assembly orientation. The process starts at step 250 to monitor display assembly orientation, such as with the sensor of FIG. 12 or an accelerometer included in the display assembly. At step 252 a determination of a rotation event is made at each of the display assemblies of the multi-display stand. If no rotation events are detected, the process returns to step 250 to continue monitoring for a rotation event. If a rotation event is detected at step 252, the process continues to step 254 to determine the display assembly orientation associated with the rotation event. The rotation event may involve one, more than one, or all display assemblies coupled to a display stand. When the display orientation is detected at step 254, the new orientation for the display assembly is forwarded to the information handling system operating system 256, such as upright or inverted and landscape or portrait. The operating system then commands an adjustment of visual images presented at the plural displays so that all of the visual images are presented upright based on the orientation detected for each individual display assembly on the multi-display stand.

Although the present invention has been described in detail, it should be understood that various changes, substitutions and alterations can be made hereto without departing from the spirit and scope of the invention as defined by the appended claims.

What is claimed is:

1. An information handling system comprising:

a housing;

a processor coupled in the housing and operable to execute instructions that process information;

a memory coupled in the housing and interfaced with the processor, the memory operable to store the information and instructions;

a peripheral display assembly having a display panel interfaced with the processor and operable to present the information as visual images;

a peripheral display stand having a display support coupled to the peripheral display assembly, a riser coupled to the display support at a front side of the riser and holding the display support in a raised position, and a base coupled to the riser at a bottom side of the riser;

a mount having first and second portions coupled to the housing in a spaced relationship to form a channel that slides onto the riser over the top of the riser with an opening at a front side to slide at least partially past the display support;

a rail formed in the mount within the channel;

a guide formed in the riser exterior, the rail engaging the guide to slide vertically up and down the rail; and opposing tabs and slots formed in the mount first and second portions to engage with each other when the mount decouples from the housing so the channel defines a space to accept the housing in a stand.

2. The information handling system of claim 1 wherein each mount portion comprises a first planar piece that couples against the housing when mounting an information handling system on the riser and rests on a desktop when holding the housing as a stand and a second planar piece orthogonal the first piece that engages the riser when mounting an information handling system on the riser.

3. The information handling system of claim 2 wherein the riser comprises an extruded aluminum tube having an interior and a slot in a front side, the mount sliding on the riser at a back side.

4. The information handling system of claim 3 further comprising an injection molded polyoxymethylene (POM) sliding member engaged in the riser interior and coupled to the display support through the slot to raise and lower the display assembly.

5. The information handling system of claim 4 further comprising:

a base insert configured to slide into the riser at a bottom opening and having an opening;

a stand base having a planar surface orthogonal the riser; and a post aligned to insert through the stand base into the base insert opening to couple the riser to the stand base, the riser and base insert rotating relative to the stand base.

6. The information handling system of claim 5 wherein the stand base is a single piece of die cast metal.

7. The information handling system of claim 4 further comprising:

a stand base having an upper portion and a lower portion; and a base insert coupled between the upper portion and the lower portion to extend upwards and into the riser at a bottom opening to couple the riser to the stand base.

8. A peripheral display comprising:

a peripheral display assembly having a display panel operable to present information as visual images;

a peripheral display stand having a display support coupled to the peripheral display assembly, a riser coupled at a front side to the display support and holding the display support in a raised position, and a base coupled to the riser at a bottom side of the riser; and a mount having first and second portions coupled to an information handling system housing in a spaced relationship to form a channel that slides onto the riser over a top side of the riser, the mount having an opening at a front side to slide at least partially past the display support at the front side and to hold the information handling system at a rear side of the riser, a rail formed in the mount within the channel, a guide formed in the riser exterior, the rail engaging the guide to slide vertically up and down the rail; and opposing tabs and slots formed in the mount first and second portions to engage with each other when the mount decouples from the information handling system housing so the channel defines a space to accept the housing in a stand.

9. The peripheral display of claim 8 wherein each mount portion comprises a first planar piece that couples against the information handling system housing when mounting an information handling system on the riser and rests on a desktop when holding the information handling system housing as a stand and a second planar piece orthogonal the first piece that engages the riser when mounting an information handling system on the riser.

* * * * *